United States Patent
Bhavsar et al.

(10) Patent No.: US 12,489,752 B2
(45) Date of Patent: Dec. 2, 2025

(54) PROVIDER SELECTION AND SCHEDULING FOR SERVICE PROVISIONING

(71) Applicant: Sandata Technologies, LLC, Hicksville, NY (US)

(72) Inventors: Vrajesh Bhavsar, Brentwood, TN (US); John Kalivas, Erie, CO (US); Sanju Melitta Pratap, Brentwood, TN (US)

(73) Assignee: Sandata Technologies, LLC, Hicksville, NY (US)

(*) Notice: Subject to any disclaimer, the term of this patent is extended or adjusted under 35 U.S.C. 154(b) by 0 days.

(21) Appl. No.: 18/884,442

(22) Filed: Sep. 13, 2024

(65) Prior Publication Data
US 2025/0193189 A1 Jun. 12, 2025

Related U.S. Application Data

(63) Continuation-in-part of application No. 18/799,721, filed on Aug. 9, 2024, which is a continuation of application No. 18/534,079, filed on Dec. 8, 2023, now Pat. No. 12,113,793.

(51) Int. Cl.
*H04L 9/40* (2022.01)

(52) U.S. Cl.
CPC ......... *H04L 63/0892* (2013.01); *H04L 63/10* (2013.01)

(58) Field of Classification Search
CPC ..... H04L 47/70; H04L 63/08; H04L 63/0892; H04L 63/10; H04L 63/101; H04L 67/60; H04L 67/62
See application file for complete search history.

(56) References Cited

U.S. PATENT DOCUMENTS

| | | | |
|---|---|---|---|
| 10,929,935 B1 | 2/2021 | Frankenfield et al. | |
| 11,704,742 B2 | 7/2023 | Frankenfield | |
| 12,113,793 B1* | 10/2024 | Bhavsar | H04L 63/0892 |
| 2005/0288972 A1 | 12/2005 | Marvin et al. | |
| 2014/0046678 A1 | 2/2014 | Lacy et al. | |
| 2014/0297297 A1* | 10/2014 | Head | G16H 50/20 |
| | | | 705/2 |
| 2016/0321410 A1 | 11/2016 | Timmerman et al. | |
| 2018/0247022 A1* | 8/2018 | Kaminsky | G16H 50/20 |
| 2019/0102397 A1* | 4/2019 | Hornkvist | G06F 16/2471 |
| 2019/0244700 A1* | 8/2019 | Aganyan | G16H 40/20 |
| 2019/0273807 A1* | 9/2019 | Mimran | H04L 67/1021 |
| 2019/0318431 A1 | 10/2019 | Niemeyer | |
| 2020/0279339 A1* | 9/2020 | Akutagawa | G06F 16/90324 |
| 2021/0012894 A1* | 1/2021 | Zelocchi | G16H 80/00 |

(Continued)

*Primary Examiner* — Jeong S Park
(74) *Attorney, Agent, or Firm* — Norton Rose Fulbright US LLP

(57) ABSTRACT

This disclosure provides systems, methods, and apparatuses, including computer programs encoded on computer storage media, to coordinate provider selection, recommendation, and service scheduling for authorized services. In one aspect, a method includes receiving an indicator associated with authorization of a service and first data associated with a recipient of the service. A prioritized list of providers may be determined based on second data associated with the providers. An authorization of the service may then be sent to at least one provider selected based on the prioritized list of providers. Other aspects and features are also claimed and described.

22 Claims, 4 Drawing Sheets

(56) References Cited

U.S. PATENT DOCUMENTS

| | | |
|---|---|---|
| 2021/0117973 A1 | 4/2021 | Lv |
| 2022/0172192 A1 | 6/2022 | Lee |
| 2023/0290523 A1* | 9/2023 | Hall ................. G16H 50/30 |
| 2024/0006083 A1* | 1/2024 | Singer .............. G16H 50/20 |
| 2024/0062869 A1* | 2/2024 | Rosenberg ........ A63B 22/0605 |

* cited by examiner

PROVIDER SELECTION AND SCHEDULING FOR SERVICE PROVISIONING

CROSS-REFERENCE TO RELATED APPLICATIONS

The present application is a continuation-in-part application of and claims priority to U.S. patent application Ser. No. 18/799,721, filed on Aug. 9, 2024, which is a continuation application of U.S. patent application Ser. No. 18/534,079, filed on Dec. 8, 2023, the disclosures of which are incorporated herein by reference for all purposes.

TECHNICAL FIELD

Aspects of the present disclosure relate generally to data processing systems, and more particularly, to systems configured to facilitate data coordination among a plurality of devices, such as devices of different entities. Some features may enable and provide enhanced interoperability, improved data processing efficiency, and reduced overall energy consumption.

INTRODUCTION

Data is the foundation of the 21st century economy. Typically, massive volumes of data are exchanged among a plurality of different devices and device types. However, in some cases, a speed with which these data exchanges may be effectuated is impeded by lack of interoperability among one or more of the devices, thereby leading to systemic inefficiencies. For example, in the context of provision of services, a first device associated with first party may send an authorization to authorize a service, a second party may perform the authorized service in response to receipt of the authorization at a second device associated with the second party, and a third party may confirm performance of the service and settle payment for the authorized service through a third device associated with the third party. Each of the first device, the second device, and the third device may use its own data formats, data types, data protocols, and the like, one or more of which may be incompatible with another device, thereby introducing inefficiencies associated with lack of device interoperability.

Additional complexity may be introduced by verification data associated with verifying that a service has, in fact, been performed, which may identify instances of fraud. For instance, verification data may include private personal information (PPI), such as geolocation data indicating a location of a site at which the service was performed and identification information identifying personnel who performed the service, identifying for whom the service was performed, or both, Further, the verification data may include service data identifying the type of service performed, which itself may be sensitive or private, especially in the context of provision of medical services. Accordingly, providing appropriate data and cyber security safeguards around this type of verification data, while sharing the data among a plurality of parties, may add to complexity of data processing systems to facilitate provision of services.

Illustrative of these problems is the provision of medical services or another service that may be covered (e.g., paid), at least in part, by a third party, such as an insurance provider. In the medical service context, an authorizing party, typically a clinician, authorizes performance of a medical service. A paying party, usually an insurer, such as a health insurance company, pays for performance of the authorized service after the service has been verifiably performed. A service provider provides the service in response to receipt of authorization from the authorizing party, the insurer, or both.

In some cases, the provider provides the service in a patient's home such that verification that the service has been performed typically is generated and submitted to the payer (e.g., the insurer). This verification information usually takes the form of electronic visit verification (EVV) data. Indeed, in the United States of America, the $21^{st}$ Century Cures Act currently requires that each claim for services performed at a patient's home is electronically verified at the point of care. Accordingly, in the context of provision of home health services, a plurality of different data types, different data encodings, different data formats, different data protocols, or the like may be generated by devices associated one or more parties involved in facilitating provision of the authorized service, and this data is exchanged by one or more of the devices associated with the parties to verify performance of the authorized service and/or to effectuate payment for the authorized service. This proliferation of different data types, different data encodings, different data formats, different data protocols, or a combination thereof, over large volumes of exchanged data, may lead to processing delays, increased memory usage, increased energy usage associated with storing and processing these disparate data types, and the like.

Additionally, extraneous data may be included among data sent and received to facilitate provision of services. This extraneous data may be unhelpful in facilitating the services, may be unnecessary to facilitate provision of the services, or both. Over a large volume of provided services, inclusion of extraneous data may exacerbate these processing delays, increased memory usage, and increased energy usage associated with the proliferation of data in the service context.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A first aspect provides a method that includes receiving an indicator associated with authorization of a service; receiving first data associated with a recipient of the service; determining, based on the first data and based on second data associated with a plurality of providers, a prioritized list of at least a subset of the providers; and sending the authorization to at least one provider selected from the prioritized list of providers.

In a second aspect, in combination with the first aspect, the first data comprises member census data for the recipient of the service and indicates that the recipient of the service is an enrolled member of an insurance company.

In a third aspect, in combination with one or more of the first aspect through the second aspect, the first data comprises location information for the recipient, a frequency of the service, scheduling preferences for the recipient, task requirements for the service, or a combination thereof.

In a fourth aspect, in combination with one or more of the first aspect through the third aspect, the second data comprises provider census data for the plurality of providers and indicates corresponding services for which the providers are authorized by an insurance company.

In a fifth aspect, in combination with one or more of the first aspect through the fourth aspect, the second data comprises provider location information, provider capability information, provider availability information, provider capacity information, provider travel capabilities, or a combination thereof.

In a sixth aspect, in combination with one or more of the first aspect through the fifth aspect, determining the prioritized list comprises filtering the plurality of providers based on geographic proximity to the recipient, service compatibility for the service, capacity availability, or a combination thereof.

In a seventh aspect, in combination with one or more of the first aspect through the sixth aspect, determining the prioritized list comprises determining, with a machine learning model, corresponding scores for each of at least the subset of the providers based on the first data and the second data; and determining the prioritized list in accordance with the corresponding scores for each of at least the subset of the providers.

In an eighth aspect, in combination with the seventh aspect, the corresponding scores are further determined based on predefined criteria comprising at least one of geographical proximity, service compatibility, provider availability, or a combination thereof.

In a ninth aspect, in combination with one or more of the seventh aspect through the eighth aspect, the corresponding scores are further determined based on historical data indicating provider performance, client satisfaction, matching success, or a combination thereof.

In a tenth aspect, in combination with one or more of the first aspect through the ninth aspect, the method further comprises determining, based on the first data and the second data, a schedule for performance of the service, wherein the schedule identifies the at least one provider for the service and one or more times for which the service is to be performed.

In an eleventh aspect, in combination with one or more of the first aspect through the tenth aspect, the method further comprises providing a secure communication channel between the recipient and the at least one provider.

In a twelfth aspect, in combination with one or more of the first aspect through the eleventh aspect, sending the authorization comprises assigning a time window for the at least one provider to accept or reject the authorization.

In a thirteenth aspect, in combination with the twelfth aspect, the method further comprising sending, after the time window expires, the authorization to another provider selected from the prioritized list of providers.

In a fourteenth aspect, in combination with one or more of the first aspect through the thirteenth aspect, the indicator associated with authorization of the service is received from a client server; the first data is received from the client server; the second data is received from an exchange server; the authorization of the service is sent to a service server; or a combination thereof.

A fifteenth aspect provides a method that includes receiving an indicator associated with authorization of a service; receiving first data associated with a recipient of the service; determining, based on the first data, a schedule for performance of the service, wherein the schedule identifies at least one provider for the service and one or more times for which the service is to be performed; and presenting the schedule for display to at least one of the recipient of the service and the provider of the service.

In a sixteenth aspect, in combination with the fifteenth aspect, the first data comprises member census data for the recipient of the service and indicates that the recipient of the service is an enrolled member of an insurance company.

In a seventeenth aspect, in combination with one or more of the fifteenth aspect through the sixteenth aspect, the first data comprises location information for the recipient, a frequency of the service, scheduling preferences for the recipient, task requirements for the service, or a combination thereof.

In an eighteenth aspect, in combination with one or more of the fifteenth aspect through the seventeenth aspect, the schedule for the service is further determined based on second data associated with the at least one provider of the service.

In a nineteenth aspect, in combination with the eighteenth aspect, the second data comprises provider census data for a plurality of providers and indicates corresponding services for which the providers are authorized by an insurance company.

In a twentieth aspect, in combination with one or more of the eighteenth aspect through the nineteenth aspect, the second data comprises provider location information, provider capability information, provider availability information, provider capacity information, provider travel capabilities, or a combination thereof.

In a twenty-first aspect, in combination with one or more of the fifteenth aspect through the twentieth aspect, the method further comprises determining, based on the first data and based on second data associated with a plurality of providers, a prioritized list of at least a subset of the providers; and selecting the at least one provider in accordance with the prioritized list.

In a twenty-second aspect, in combination with one or more of the fifteenth aspect through the twenty-first aspect, the schedule further identifies assigned tasks for the at least one provider.

In a twenty-third aspect, in combination with one or more of the fifteenth aspect through the twenty-second aspect, the method further comprises receiving, from at least one of the recipient and the at least one provider, a response from at least one of the recipient and the at least one provider; determining an adjusted schedule based on the response and the schedule; and presenting the adjusted schedule for display to at least one of the recipient of the service and the provider of the service.

In a twenty-fourth aspect, in combination with the twenty-third aspect, the response indicates a scheduling conflict and adjusting the schedule comprises resolving the scheduling conflict.

In a twenty-fifth aspect, in combination with one or more of the twenty-third aspect through the twenty-fourth aspect, the scheduling conflict is caused by overlapping tasks for the at least one provider, unavailability of the at least one provider, or a combination thereof.

In a twenty-sixth aspect, in combination with one or more of the twenty-third aspect through the twenty-fifth aspect, the response indicates a changed condition for the service, the provider, the recipient, or a combination thereof, and wherein the adjusted schedule complies with the changed condition.

In a twenty-seventh aspect, in combination with one or more of the twenty-third aspect through the twenty-sixth aspect, the changed condition comprises a changed requirement for the service, a changed availability of the at least one provider, a changed availability of the recipient, or a combination thereof.

A twenty-eighth aspect provides a system that includes a processing system that includes one or more processors and one or more memories coupled with the one or more processors. The processing system may be configured to receive an indicator associated with authorization of a service; receive first data associated with a recipient of the service; determine, based on the first data and based on second data associated with a plurality of providers, a prioritized list of at least a subset of the providers; and send the authorization to at least one provider selected from the prioritized list of providers.

A twenty-ninth aspect provides a system that includes a processing system that includes one or more processors and one or more memories coupled with the one or more processors. The processing system may be configured to receive an indicator associated with authorization of a service; receive first data associated with a recipient of the service; determine, based on the first data, a schedule for performance of the service, wherein the schedule identifies at least one provider for the service and one or more times for which the service is to be performed; and present the schedule for display to at least one of the recipient of the service and the provider of the service.

Some details associated with the implementations are described above, and others are described below. Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like Reference numbers and designations in the various drawings indicate like elements.

DETAILED DESCRIPTION

Figure 1:
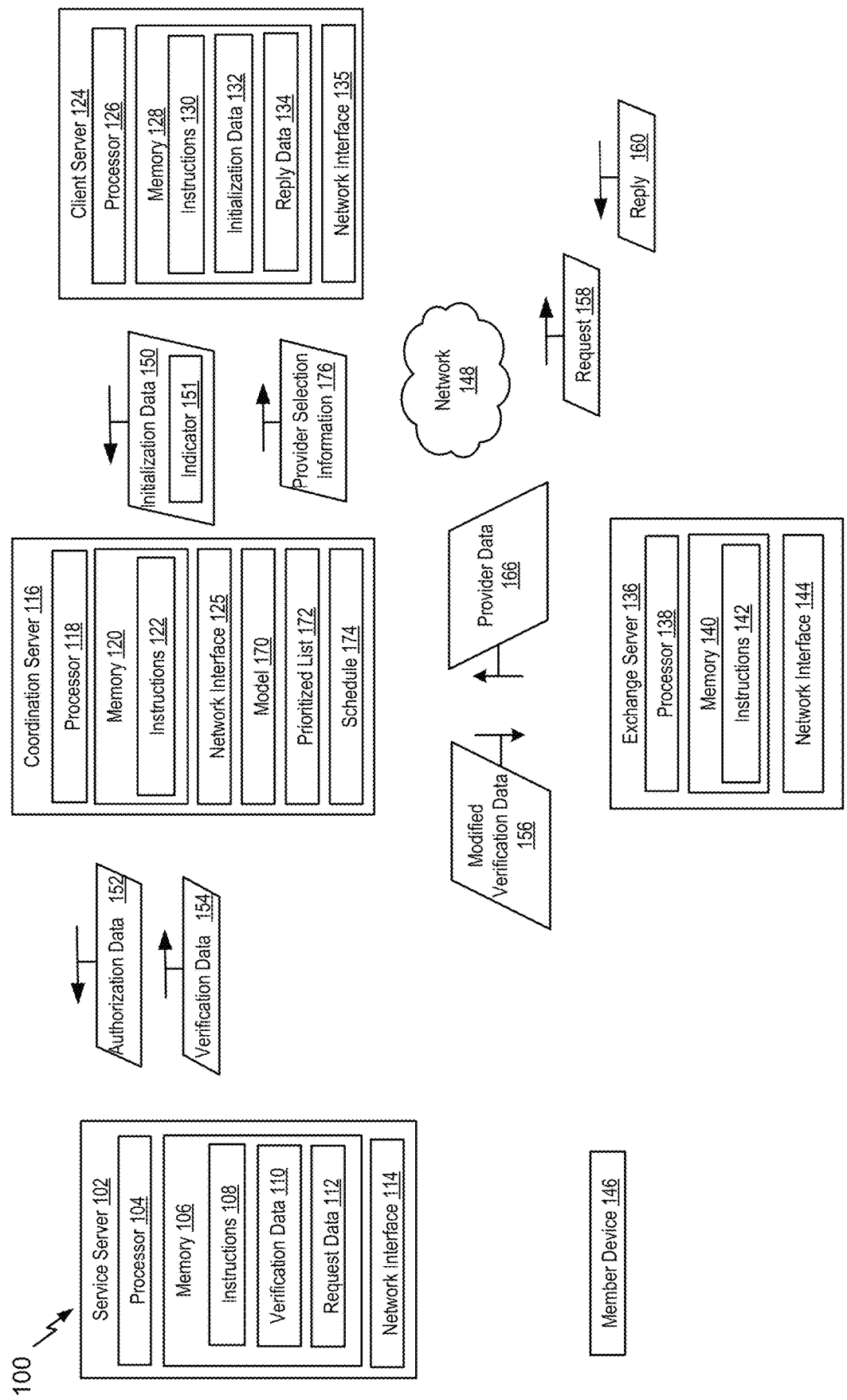
FIG. 1 is a block diagram of an example data processing system 100 that supports data coordination according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media that support managing the authorization, provisioning, and scheduling of services, including services in which verification and authorization of service performance is advantageous, such as home healthcare. In particular, the proposed techniques may enable provider selection or recommendations based on authorized service information, scheduling of the performance of services, or combinations thereof. The techniques may leverage predictive analytics and real-time data to provide more accurate services in a timely fashion. In particular, the proposed techniques may ensure that services are authorized and scheduled efficiently, matching clients with suitable providers based on various criteria and client preferences and may generate and dynamically adjust schedules responsive to real-time changes. These techniques may also verify service delivery, enhance service quality, and improve regulatory compliance.

In the current domain of service provisioning, coordination between payers, providers, and clients is critical for timely and efficient service delivery. Existing techniques generally involve manual or semi-automated processes, resulting in fragmented and inefficient coordination.

Existing techniques may typically rely on manual processes for coordination, leading to inefficiencies and errors. This reliance results in a significant administrative burden on providers and payers alike. Clients frequently face delays in receiving services due to inflexible and slow scheduling systems. The lack of real-time provider availability data exacerbates this problem, making the timely matching of clients to providers difficult.

Additionally, current techniques may typically fail to effectively match clients with appropriate providers, and may not be able to account for various factors such as provider skill sets, client preferences, and real-time provider availability. This inadequate matching can lead to suboptimal service delivery and client dissatisfaction. Additionally, providers struggle with managing schedules and service authorizations due to changes in payer or provider networks. This struggle can lead to service disruptions and inefficiency, further complicating the service delivery process.

In industries such as home healthcare, these inefficiencies are particularly evident due to the high complexity of interactions and requirements. Additionally, industries such as healthcare may be particularly sensitive to the need for timely and accurate identification and assignment of qualified service providers.

One solution to this problem is to use a system, such as a coordination server, to utilize information (such as information used to verify or authorize a service) to select or recommend providers and/or determine service schedules, such as by using predictive analytics or similar techniques. In one aspect, a coordination server may receive an indicator associated with the authorization of a service and first data associated with a recipient. This first data can include information such as member census data, location information, service frequency, scheduling preferences, and task requirements. Based on this first data, along with second data related to a plurality of providers (which may include provider census data, location information, capability information, availability information, and capacity information), a prioritized list of at least a subset of the providers is determined. This list may be generated by filtering the providers based on criteria such as geographic proximity to the recipient, service compatibility, and capacity availability. Furthermore, a machine learning model may be used to determine corresponding scores for each of the providers, factoring in the first and second data, and considering predefined criteria such as geographical proximity, service compatibility, provider availability, and historical data on provider performance. The system then sends the authorization to at least one provider selected from the prioritized list. Additional functionalities may include providing a secure communication channel between the recipient and the provider, assigning a time window for the provider to accept or reject the authorization, and, if the time window expires, sending the authorization to another provider from the prioritized list. The method may also extend to determining a schedule for the service performance and presenting this schedule for display to both the recipient and the provider.

In certain instances, the coordination server may be configured to determine schedules for services based on the first data, the second data, or a combination thereof. In particular, the coordination server may determine a schedule for the performance of the service that identifies at least one provider for the service and specifies one or more times for which the service is to be performed. This schedule may then be presented for display to at least one of the recipient of the service and the provider of the service. The schedule may also be determined based on the second data associated with the provider, such as to account for provider availability, travel times, and the like. The schedule may also identify assigned tasks for the provider. Additional steps may involve receiving a response from the recipient or the provider, and adjusting the schedule based on this response to resolve scheduling conflicts or accommodate changed conditions. These changes could include modifications in service requirements, availability of the provider, or availability of the recipient. The updated schedule may then be presented for display, ensuring that service delivery is optimized and any conflicts or changes are appropriately managed.

In some aspects, the present disclosure provides techniques for managing and scheduling services that may be particularly beneficial in enhancing the coordination and efficiency of service delivery. For example, the present techniques may automate the matching and scheduling processes, significantly reducing the administrative workload on providers and payers. By using predictive analytics, these techniques may optimize provider selection and scheduling, ensuring that clients receive timely and appropriate services.

Clients may experience fewer delays and interruptions in their service provision, enhancing their overall experience. The system's ability to handle real-time adjustments allows for flexible scheduling, accommodating client preferences and unexpected changes seamlessly. Providers may benefit from better capacity management and fewer scheduling conflicts. The predictive models may help providers foresee and mitigate potential issues, ensuring higher client satisfaction and effective use of resources.

These techniques help payers maintain compliance with relevant regulations by providing detailed schedules and verified service delivery reports, thus ensuring accountability and proper documentation. By fostering better coordination among all stakeholders, these techniques aim to elevate the overall quality and reliability of service provisioning.

FIG. 1 is a block diagram of example data processing system 100 that supports service provisioning and data coordination according to one or more aspects. Data processing system 100 includes a service server 102, a coordination server 116, a client server 124, an exchange server 136, a member device 146, and a network 148. Although one service server 102, one client server 124, and one member device 146 are depicted, in some other implementations, data processing system 100 may include multiple service servers, multiple client servers, multiple member devices, or combinations thereof. Additionally, or alternatively, although service server 102, coordination server 116, client server 124, and exchange server 136 are each described as servers, in other implementations, at least one of service server 102, coordination server 116, client server 124, and exchange server 136 may include or be a device other than a server, such as a computer or mobile device. In some implementations, each of service server 102, coordination server 116, client server 124, and exchange server 136 may be associated with or correspond to a different entity, such as a different individual, a different company, a different organization, etc.

Service server 102 may include a variety of components (such as structural, hardware components) used for carrying out one or more functions described herein. For example, these components may include one or more processors 104 (hereinafter referred to collectively as "processor 104"), one or more memory devices 106 (hereinafter referred to collectively as "memory 106"), and one or more network interfaces 114 (hereinafter referred to collectively as "network interface 114"). Processor 104 may be configured to execute instructions 108 stored in memory 106 to perform the operations described herein. Processor 104 may include or correspond to a CPU or microprocessor, a graphics processing unit ("GPU"), microcontroller, or a combination thereof that has been programmed to perform the functions of service server 102. Implementations described herein are not restricted by the architecture of processor 104 so long as processor 104, whether directly or indirectly, supports the operations described herein. Processor 104 may be one component or multiple components that may execute the various described logical instructions. The present disclosure is not restricted by the architecture of processor 104, as long as processor 104 supports modules, configurations, or operations as described herein. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality. In some implementations, a module is "[a] self-contained hardware or software component that interacts with a larger system." Alan Freedman, "The Computer Glossary" 268 (8th ed. 1998).

Memory 106 includes or is configured to store instructions 108, verification data 110, and request data 112. Verification data 110 may include or correspond to data indicating that a service was performed. For instance, verification data 110 may include geolocation data, a random value generated on a fob, biometric data such as verified voice data, or combinations thereof. As another example, verification data 110 may include or correspond to visit verification (EVV) data. Request data 112 may include data associated with a request generated by service server 102. For instance, request data 112 may include or correspond to an insurance claim, a request for payment, or a combination thereof.

Network interface 114 may be a network interface card (NIC), a transmitter, a receiver, a transceiver, or any combination thereof. Network interface 114 may be configured to communicate using a plurality of communication protocols, such as a Bluetooth™ protocol, a Zigbee™ protocol, a cellular communication protocol, such as any of the 3G, 4G, and/or 5G communication protocols, or any combination thereof. Additionally, network interface 114 may be any networking hardware capable of communicating using the 802.11 communication standard, the Ethernet communication standard, or other communication standards that may be developed Coordination server 116 may include a variety of components (such as structural, hardware components) used for carrying out one or more functions described herein. For example, these components may include one or more processors 118 (hereinafter referred to collectively as "processor 118"), one or more memory devices 120 (hereinafter referred to collectively as "memory 120"), and one or more network interfaces 125 (hereinafter referred to collectively as "network interface 124"). Processor 118, memory 120, and network interface 125 may be analogous to processor 104, memory 106, and network interface 114, respectively, of service server 102 and may thus include similar or corresponding features, components, structures, or combinations thereof as described in the context of service server 102. For example, processor 118 may be configured to execute instructions 122 stored in memory 120 to perform the operations described herein. Additionally, the memory 120 may be configured to store one or more models 170, a prioritized list 172 of providers, and/or a schedule 174, as detailed further below.

Client server 124 may include a variety of components (such as structural, hardware components) used for carrying out one or more functions described herein. For example, these components may include one or more processors 126 (hereinafter referred to collectively as "processor 126"), one or more memory devices 128 (hereinafter referred to collectively as "memory 128"), and one or more network interfaces 135 (hereinafter referred to collectively as "network interface 135"). Processor 126, memory 128, and network interface 135 may be analogous to processor 104, memory 106, and network interface 114, respectively, of service server 102 and may thus include similar or corresponding features, components, structures, or combinations thereof as described in the context of service server 102. For example, processor 126 may be configured to execute instructions 130 stored in memory 128 to perform the operations described herein.

Additionally, memory 128 is configured to store initialization data 132 and reply data 134. Initialization data 132 includes data to initialize a data coordination operation performed by coordination server 116. For example, initialization data 132 may include authorization data, census data, service data, or combinations thereof. Authorization data may include or correspond to an authorization, received from a device associated with a third party, to authorize performance of one or more services. For instance, authorization data may include or correspond to a clinician authorization to perform one or more medical services received from a clinician device. As another example, authorization data may include or correspond to authorization to perform a service, such a medical service, a repair service, or other service. In some implementations, the service may be authorized by an entity (e.g., an individual, a company, etc.) that is associated with or corresponds to client server 124. Census data may include unique identifiers indicating an identity of members associated with a client operating client server 124, indicating an identity of a service provider operating service server 102, or a combination thereof. Service data may indicate one or more authorized services to be performed, a quantity of the one or more authorized services, or a combination thereof. Reply data 134 may include transactional data associated with completion of the one or more authorized services, such as payment information.

Exchange server 136 may include a variety of components (such as structural, hardware components) used for carrying out one or more functions described herein. For example, these components may include one or more processors 138 (hereinafter referred to collectively as "processor 138"), one or more memory devices 140 (hereinafter referred to collectively as "memory 140"), and one or more network interfaces 144 (hereinafter referred to collectively as "network interface 144"). Processor 138, memory 140, and network interface 144 may be analogous to processor 104, memory 106, and network interface 114, respectively, of service server 102 and may thus include similar or corresponding features, components, structures, or combinations thereof as described in the context of service server 102. For example, processor 138 may be configured to execute instructions 142 stored in memory 140 to perform the operations described herein.

Member device 146 may include a variety of components (such as structural, hardware components) used for carrying out one or more functions described herein. These components may include one or more processors, one or more memories, one or more network interfaces, and one or more input/output (I/O) devices. The one or more I/O devices may be configured to receive input from and provide output to a member associated with member device 146. For instance the one or more I/O devices may include a display configured to render a graphical user interface (GUI) depicting, to a member, data obtained from service server 102 in response to a query made by member device 146 to service server 102. In some implementations, member device 146 may be associated with or correspond to an individual that receives performance of the service.

Network 148, such as a communication network, may facilitate communication of data among components of data processing system 100. For example, network 148 may also facilitate communication of data among service server 102, coordination server 116, client server 124, exchange server 136, member device 146 or any combination thereof. Network 148 may include a wired network, a wireless network, or a combination thereof. For example, network 148 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

During a typical cycle of operation of data processing system 100, coordination server 116 may receive initialization data 150 from client server 124. The initialization data 150 may include an indicator 151. Indicator 151 is associated with authorization data (e.g., 152). In some implementations, indicator 151 may include or indicate authorization data (e.g., 152). For example, initialization data 150 may indicate authorization data 152 by including and index value or a pointer to a memory location of memory 128 storing authorization data 152. Coordination server 116 may obtain authorization data 152 from or based on initialization data 150 and may send authorization data 152 to service server 102. By extracting authorization data 152 from initialization data 150 or otherwise obtaining authorization data 152 and sending authorization data 152 in lieu of initialization data 152, coordination server 116 may reduce a total quantity of data (e.g., a number of bytes of data) being sent to service server 102. In some implementations, authorization data 152 may indicate or identify authorized services to be performed, a quantity of such authorized services (e.g., a number of units) to be performed, or a combination thereof.

In response to transmission of authorization data 152 to service server 102, coordination server 116 may receive verification data 154 from coordination server 116. In some implementations, verification data 154 may include or indicate EVV data. Based on verification data 154, coordination server 116 may generate modified verification data 156. Modified verification data 156 may indicate whether or not an authorized service has been performed, a quantity of authorized services that have been performed, or both. For example, verification data 154 may include data verifying that an authorized service has been performed. Additionally, or alternatively, verification data 154 may include data indicating particulars regarding performance of the authorized service, such as a timeframe during which the authorized service was performed, identities of personnel performing the authorized service, biometric data associated with personnel performing the authorized service, geolocation data indicating a location at which an authorized service was performed, or combinations thereof.

In some implementations, modified verification data 156 may only indicate that the authorized service was performed or was not performed, a quantity of an authorized service that was performed assuming that the authorized service was performed, or a combination thereof. Additionally, or alternatively, modified verification data 156 may exclude all other data included in verification data 154 other than EVV data. Accordingly, by removing other components of verification data 154 to generate modified verification data 156, coordination server 116 may reduce a quantity of data (e.g., may reduce a number of bytes of data) being provided to service server 102. Additionally, by removing other components of verification data 154 to generate modified verification data 156, especially by removing or obscuring PII, coordination server 116 may enhance an overall level of data security.

Coordination server 116 may send modified verification data 156 to exchange server 136. Based on receipt of modified verification data 156, exchange server 136 may send request 158 to client server 124. Request 158 may include or correspond to a request for payment for rendered authorized services, completion of which is verified by modified verification data 156. In implementations, exchange server 136 may have received request 158 from coordination server 116 which itself may have received request 158 from service server 102. Service server 102 may generate request 158 based on request data 112 in response to receipt of verification data 110 from a service provider indicating that one or more authorized services associated with authorization data 152 have been completed.

In response to transmission of request 158 to client server 124, exchange server 136 may receive reply 160 from client server 124. Client server 124 may generate reply 160 based on reply data 134. Reply 160 may include transactional information associated with performed authorized services, such as payment information. For example, reply 160 may include data to facilitate withdrawal funds from one or more accounts associated with client operating client server 124, an indication of a quantity of payment to be tendered, an indication that payment will not be tendered, or a combination thereof. In implementations, exchange server 136 may send reply 160 to coordination server 116, and coordination server 116 may send reply 160 to service server 102.

Coordination server 116 may be configured to standardize a format, an encoding, or both of data received from other devices of data processing system 100. For example, in obtaining authorization data 152 from or based on initialization data 150 or otherwise obtaining authorization data 152 indicated by initialization data 150, coordination server 116 may be configured to standardize a formatting, an encoding, or both of authorization data 152. By standardizing a formatting, an encoding, or both of authorization data 152, authorization data 152 may be converted into platform agnostic data such that any device may decode, parse, or use authorization data 152. To illustrate, data processing system 100 may include a plurality of service servers, each potentially executing its own operating system. By standardizing a formatting, an encoding, or both of authorization data 152, authorization data 152 may be decoded by, parsed by, or used by any service server regardless of the operating system that the service server executes. In like fashion, coordination server 116 may standardize a formatting, an encoding, or both of modified verification data 156, request data, reply data, or combinations thereof. For instance, just as data processing system 100 may include a plurality of service servers, data processing system 100 also may include a plurality of client servers, such as client server 124, each potentially executing a different operating system. By standardizing the formatting, encoding, or both of data received by coordination server 116, coordination server 116 configures the data so that the data may be decoded by, parsed by, or used by a wide variety of devices, such as a wide variety of client servers, service servers, or both that may be components of data processing system 100.

Moreover, coordination server 116, exchange server 136, or both may be configured to perform a data verification and management operation. In performing the data verification and management operation, coordination server 116, exchange server 136, or both may be configured to identify missing data, such as components of initialization data 150, verification data 154, request 158, reply 160, or any combination thereof, the lack of which may impede or prevent resolution of request 158, reply 160 or both. For example, coordination server 116 may be configured to identify that a specified quantity of authorized services (e.g., a maximum number of units of authorized services) is missing from the authorization data included in initialization data 150. In response to identifying a lack of one or more items of data, coordination server 116 may be configured to message the appropriate device (e.g., service server 102, client server 124, exchange server 136) to request the missing one or more items of data.

Further, in performing the data verification and management operation, coordination server 116, exchange server 136, or both may be configured to manage data. For example, in a context in which the authorization data included in initialization data 150 authorizes performance of a maximum quantity of authorized services (e.g., a maximum number of units of authorized services), coordination server 116 may be configured to account for the quantity of performed authorized services.

To illustrate, in a health care context, authorization data included in initialization data 150 may authorize performance of a first quantity, such as x units (e.g., x hours), of an authorized service (e.g., physical therapy services). Verification data 154 may indicate that a second quantity, such as y units (e.g., y hours), of authorized services were performed. Coordination server 116 may be configured to compare the first quantity, such as the y units of performed services, against the second quantity, such as the x units of authorized services. In response to identifying that the first quantity (e.g., the y units) exceeds the second quantity (e.g., the x units), coordination server 116 may be configured to generate a reply, such as reply 160, denying a request, such as request 158, for payment of the y units of services. In response to identifying that the first quantity (e.g., the quantity of y units) is less than the second quantity (e.g., the quantity of x approved units), coordination server 116 may be configured to decrement the second quantity (e.g., the x units) by the first quantity (e.g., the y units). Additionally, coordination server 116 may further be configured to iteratively compare any further units of services performed as might be indicated in any additional verification data 154 received to ensure that the total number of performed units of authorized services do not exceed the approved quantity of authorized services indicated in the authorization data.

While coordination server 116 may deny a request (e.g., request 158) in the event that the quantity of units of performed services exceeds the quantity of units of authorized services, in some implementation, coordination server 116 may initiate other actions. For instance, coordination server 116 may message client device 124 to seek an authorization for payment of the excess. Additionally, while the data management functionality is described with reference to coordination server 116, the described data management functionality may be performed by exchange server 136.

While data processing system 100 is not limited to any particular operational environment, an example involving insurance transactions may be provided. In an example, client server 124 may be operated by an insurance company or health services payor, such as a governmental entity (e.g., a governmental entity administering Medicare or foreign analog thereof). Service server 102 may be operated by a service provider, authorized by the insurance company or health services payor, to provide one or more servers to members of the insurance company or recipients of benefits from the health services payor. Member device 146 may be operated by a member of the insurance company or recipient of benefits from the health services payor, who pays premiums to the insurance company to protect member against certain risks as specified in a contract between the member and the insurance company or who otherwise is entitled to receive benefits from the health services payor. For example, the member may be diagnosed with a health condition necessitating that a medical service is provided at the member's home. Accordingly, a clinician, operating a clinician device (not illustrated) may send an authorization to client server 124, authorizing the medical service.

Client server 124 may be configured to generate initialization data 132 by bundling the authorization with other data. For example, this other data may include a member identifier corresponding to the member and uniquely identifying the member for whom the medical service is to be provided, a service provider identifier uniquely identifying a service provider authorized to perform the medical service, service data indicating particulars about the medical service to be performed (e.g., a unique identifier corresponding to the service), such as a quantity of services to be provided, and other data, collectively constituting initialization data 132. Client server 124 may send initialization data 132, which may correspond to initialization data 150, to coordination server 116. Coordination server 116 may extract authorization data 152 from or derive authorization data 152 based on initialization data 150 and may send authorization data 152 to service server 102. Alternatively, initialization data 150 may include a pointer to a memory location of memory 128 storing authorization data 152, and coordination server 116 may obtain authorization data 152 from the memory location.

Service server 102 may send authorization data 152 to one or more devices (e.g., a laptop, a smartphone, etc.) associated with a service provider. Based on receipt of authorization data 152 at the device associated with the service provider, the service provider may perform the medical service at the member's home. For example, a medical service may include physical therapy to be performed at the member's home.

In response to completion of the service, the service provider may generate verification data 110, which the service provider may send, using the device associated with the service provider, to service server 102. Verification data 110 may include a voice message indicating that the service has been performed, geolocation data indicating a location of the device associated with the service provider, a timeframe indicating a date and time at which performance of the service was commenced and a date and time at which performance of the service was completed, details regarding performance of the service, or combinations thereof. For example, verification data 110 may include a unique code provided to the device associated with the service provider in response to the service provider affirming that the services have been completed. As another example, verification data 110 may include or correspond to EVV. Service server 102 may store verification data 110 in memory 106 and may be configured to authenticate components of verification data 110. For instance, if verification data 110 includes a voicemail from the service provider to indicate that the service has been completed and geolocation data, service server 102 may be configured to compare the voice data included in the voicemail against exemplars of the service provider's voice stored in memory 106 to verify an identity of the service provider. Additionally, service server 102 may compare geolocation data included in verification data 110 against location data of a member's home (e.g., an address) to verify that the device associated with the service provider was at the member's home.

Service server 102 may send verification data 154, which may correspond to verification data 110, to coordination server 116. Additionally, in response to receipt of verification data 110 from a device associated with the service provider, service server 102 may be configured to generate request data 112 and store request data 112 in memory 106. Request data 112 may include or correspond to a request for payment for the services, such as an insurance claim (e.g., an "837" in health insurance terminology). In implementations, service server 102 may send verification data 154, the request, or both to coordination server 116.

Coordination server 116 may be configured to generate modified verification data 156 based on verification data 154. Modified verification data 156 may include only an indication that the service was performed or was not performed. For instance, modified verification data 156 may be a single bit in which a "1" indicates that the service was performed and a "0" indicates that the service was not performed or vice versa. In implementations, coordination server 116 may analyze verification data 154 to determine whether the service corresponding to verification data 154 was, in fact, performed. Coordination server 116 may send modified verification data 156 to exchange server 136. Additionally, coordination server 116 may send the request to exchange server 136. In implementations, coordination server 116 may standardize the request to standardize a formatting, an encoding, or both of the request. For instance, coordination server 116 may format the request so that the request has a formatting that is standard in the insurance industry, converting the request into an "837" insurance claim, as may be typically used in the health insurance industry.

In response to modified verification data 156 indicating that the service was performed, exchange server 136 may send request 158 to client server 124. In some implementations, exchange server 136 also may send modified verification data 156 to client server 124.

In response to receipt of request 158, client server 124 may generate reply 160. Reply 160 may include payment data. In implementations, exchange server 136 may send reply 160 to coordination server 116, and coordination server 116 may send reply 160 to service server 102. In such implementations, coordination server 116 also may standardize reply 160 to standardize a formatting, an encoding, or both of reply 160. For instance, coordination server 116 may standardize reply 160 in accordance with a format typically used by the health insurance industry. In particular, coordination server 116 may convert reply 160 into an "835" (e.g., a format typically used in the health insurance industry) to indicate payment for the service. In this manner, payment for authorized services may be effectuated in response to objective verification that the authorized services were, in fact, performed.

In certain implementations, the coordination server 116 may be configured to perform one or more additional operations relating to the provisioning and authorization of services. For example, the coordination server 116 may be configured to prioritize, recommend, select, or otherwise indicate providers for a particular authorized service. As another example, the coordination server 116 may be configured to assist with scheduling the performance of a service (such as scheduling one or more visits or appointments with the provider).

In certain implementations, the coordination server 116 may be configured to receiving an indicator 151 associated with the authorization of a service. For example, the indicator 151 may be received with initialization data 150, as discussed above. In certain implementations, the indicator 151 may be received from a client server 124, which may be associated with a payer such as an insurance company. In response, the coordination server 116 may be configured to initiate the process of matching the client to an appropriate provider capable of delivering the authorized service. The authorization indicator may include various relevant details, such as the type of service authorized, the duration and frequency of the service, and any other pertinent parameters associated with the service authorization. For example, the authorization indicator might specify that the service authorized is home healthcare, with a duration of up to six months and frequency of three times a week, including additional parameters like eligibility conditions, provider preferences, and payment terms.

Upon receiving the authorization indicator, the coordination server 116 may be further configured to receive first data associated with the recipient of the service. This first data may be received from the client server 124, a member device 146, the exchange server 136, or combinations thereof. The first data may include member census data indicating that the recipient is an enrolled member of an insurance company. Additionally, the first data may include location information for the recipient, information regarding the frequency of the service required, scheduling preferences, and/or specific task requirements for the service, such as the type of care needed (e.g., physical therapy, personal care) and the required frequency and duration of services. For example, the first data may specify that the recipient requires physiotherapy services twice a week at their residence, and that the recipient is available on Tuesdays and Thursdays between 10 am and 12 pm. The first data may also indicate the recipient's need for post-operative knee care, such as by specifying particular exercises or mobility tests for the recipient. In certain implementations, the first data may be received with the initialization data 150.

The coordination server 116 may be configured to receiving second data associated with a plurality of providers. The second data may be received from the exchange server 136, the service server 102, or combinations thereof. The second data may include provider census data, which indicates the services for which the providers are authorized by the payer, such as the insurance company associated with the indicator 151. Further, the second data may include location information of the providers, information identifying capabilities and skills for the providers, availability and capacity information, provider travel capabilities (such as a maximum travel distance), and/or provider qualifications, specializations, and certifications. For example, the second data may indicate that a provider is authorized to offer advanced cardiac life support services, that the provider operates out of a particular address, that the provider can travel up to 40 miles from the indicated address, and that the provider is available weekdays from 9 a.m. to 5 p.m. The second data may also indicate that the provider has a total patient capacity of 20 patients per week and may indicate that the provider is currently treating 15 patients per week. In certain implementations, the second data may be received as provider data 166.

The coordination server 116 may be configured to determine a prioritized list 172 of providers based on the first data and the second data. The prioritized list of partners may rank at least a subset of the plurality of providers for assignment to fulfill the service. In certain implementations, the coordination server 116 may be configured to prioritize providers based on predetermined criteria (such as geographic proximity to the recipient, compatibility of the services offered by the providers with the required service, and the availability of provider capacity). For instance, providers located closer to the recipient and those offering services that match the recipient's needs may be prioritized higher on the list.

In certain implementations, the coordination server 116 may utilize one or more machine learning models 170 to determine the prioritized list 172. For example, the coordination server 116 may include a model 170 that is trained to receive the first data and the second data and to generate corresponding scores for each of at least a subset of the providers based on the first and second data. The scores may be based on predefined criteria, including geographic proximity, service compatibility, provider availability, and historical data indicating the provider's performance, client satisfaction, and matching success rates. For example, a provider might receive an overall score of 85 out of 100 based on a plurality of scores corresponding to different criteria. In particular, the scores may include a geographic proximity score, with higher scores indicating a shorter distance from the client, a service capability score, with higher scores indicating a greater similarity between the provider's qualifications and capabilities and the authorized service; an availability alignment score that indicates an overlap between the provider's availability and the recipient's availability; and a historical satisfaction score based on past service outcomes, reviews from other clients, and performance metrics. In the preceding example, the provider may have a geographic proximity scores of 30/30 because they are located close to a recipient's home, a service capability score of 20/25 based on corresponding qualifications, an availability alignment score of 15/20 based on some shared availability with the recipient, and a historical satisfaction score of 20/25, for the total score of 85/100.

The prioritized list 172 of the providers may then be determined based on the scores (such as to identify the providers with the highest scores). For example, the coordination server 116 may be configured to determine the prioritized list to contain a predetermined number of providers, based on the scores (such as the top 1, top 3, top 5, top 10, top 20 providers, and the like).

The coordination server 116 may be configured to send the authorization to at least one provider selected from the prioritized list. For example, the coordination server may transmit authorization data 152 to a service server 102 accessible by the at least one provider.

In certain implementations, the coordination server 116 may transmit an indication of the at least one provider to the client server 124. For example, the coordination server 116 may assign a specific time window within which the selected provider can accept or reject the authorization when sending the authorization data 152. If the provider accepts the authorization, then provider selection information 176 may be transmitted to the client server 124 (such as for viewing by the recipient via the member device 146). If the provider does not respond within the designated time window, the system may reassign the authorization to another provider from the prioritized list.

In certain implementations, the coordination server 116 may be configured to determine a schedule 174 for performance of the service. The schedule 174 may identify the specific provider assigned to deliver the service and outline one or more times at which the service is to be performed. In certain implementations, the schedule 174 may be determined in response to receiving the indicator 151 of the authorized service (such as after receiving the initialization data 150). In additional or alternative implementations, the schedule 174 may be determined in response to sending authorization data 152 identifying a selected provider, in response to receiving an acceptance from the selected provider, or a combination thereof.

In certain implementations, the coordination server 116 may be configured to determine the schedule 174 based on the first data, the second data, or a combination thereof. For example, the one of the machine learning models 170 may be trained or otherwise configured to determine schedules based on predefined criteria, which may be indicated by the first data and/or the second data. For example, the schedule 174 may be determined to comply with location and travel requirements, availability for the provider and the recipient, preferred service times, travel reduction for the provider from preceding appointments, equipment availability, and the like. For instance, if a recipient requires dialysis care at their home, and their preferred service times are early mornings on weekdays, the system would prioritize appointment times in the mornings on weekdays.

The coordination server 116 may be configured to transmit the schedule 174 to the recipient of the service, a provider of the service, or a combination thereof. For example, the schedule 174 may be included in authorization data 152 transmitted to a selected provider for a service in order to receive acceptance from the provider. As another example, the schedule 174 may be transmitted with provider selection information 176 to the client server 124 for review and acceptance by a recipient of the service.

Users may then have the opportunity to provide feedback on the schedule 174, which may include concerns or preferences related to timing, specific tasks, or other personal considerations. Replies 160 may indicate feedback or other adjustments to the schedule 174.

For example, the coordination server 116 may be configured to receive, from at least one of the recipient and the at least one provider, a response from at least one of the recipient and the at least one provider, which may provide feedback. For example, a provider may respond indicating that the assigned times clash with another critical appointment. The coordination server 116 may then be configured to adjust the schedule based on the response. For example, if the response indicates a scheduling conflict as pointed out by the recipient or provider, the coordination server 116 may adjust schedule by altering the time of the conflicting appointment to resolve the scheduling conflict. The coordination server 116 may then present the adjusted schedule for display to at least one of the recipient of the service and the provider of the service.

In certain implementations, the reply 160 may indicate a changed condition for the service, the provider, the recipient, or a combination thereof, by ensuring the adjusted schedule complies with the new conditions. For instance, if information is received (such as via the client server 124) that a recipient suddenly needs to start dialysis treatments and requires schedule changes to fit these new sessions, the coordination server 116 may be configured to modify their existing care schedule to accommodate the new dialysis sessions.

In certain implementations, the reply 160 may indicate a scheduling conflict caused by overlapping tasks for the at least one provider or unavailability of the at least one provider, or a combination thereof, the system acts to resolve these conflicts. For example, if two recipients' care schedules conflict and the provider is available for only one slot, the coordination server 116 may adjust one of the scheduled appointments to a later available slot.

In certain implementations, the coordination server may be configured to perform real-time adjustments to schedules 164 based on dynamic conditions and feedback. For example, replies may be received that indicate changes in client availability, unforeseen provider unavailability, and the like. In response, the coordination server 116 may be configured to determine an updated schedule (such as allowing for real-time reallocation of tasks, adjustment of time slots, or other necessary modifications) and transmit the updated schedule in real time for approval. In certain implementations, the coordination server 116 may also be configured to perform predictive rescheduling to adjust schedules dynamically based on real-time information and historical data.

In certain implementations, the system 100 may be configured to integrate with third-party services, such as transportation or meal delivery. For example, the schedule 174 may include information regarding meal requirements for a recipient (such as the recipient requires two meals a day, five days a week, with particular nutrition requirements). In such instances, the system 100 may transmit requests to a third-part meal service specifying dates and times for meals, or a quantity and frequency of meals for delivery. For example, the system may automatically generate a request to a registered meal service provider via an application programming interface (API) associated with the meal service provider. The request may indicate nutrition requirements, number of meals, delivery frequency, and delivery locations for the recipient. As another example, if a recipient needs to attend a weekly physiotherapy session at a clinic located 10 miles away, the system can automatically schedule and coordinate transportation services to and from an appointment location by sending requests to a transportation provider via an API indicating pick-up times, starting locations, and destination locations based on service times within the schedule 174.

In certain implementations, the system 100 may establish a secure communication channel between the recipient and the selected provider to facilitate the coordination of care. For example, the system 100 may establish a secure communication channel using end-to-end encryption, which may support text-based, audio-based, videoconferencing, or other types of communication.

In certain implementations, the coordination server 116 may be configured to allow for the override of client preferences (such as during provider selection, scheduling, or a combination thereof) by certain users (such as healthcare professionals) if certain conditions are met (such as if overriding is deemed medically necessary). For instance, a recipient may have a conflicting medical appointment scheduled or may require emergency care, which may be determined based on member census data for the recipient. In such instances, medical personnel may override scheduled weekly physical therapy sessions to accommodate the change.

In certain implementations, the system 100 may be configured to perform real-time validation of data received from clients and providers. For example, the first data and/or the second data may be verified, authenticated, and/or validated using the techniques discussed above. Real-time data validation helps in minimizing errors and inconsistencies that could adversely affect service delivery, thus maintaining the integrity of the system's operations and enhancing overall efficiency.

To ensure ongoing improvement, the system 100 may support mechanisms for continuous learning and optimization. For example, the system 100 may provide a structured feedback mechanism in which responses or other messages from providers are received and indicate issues or suggest improvements in real-time (such as for scheduling, service provisioning, recipient issues, and the like). For example, providers and/or recipients may provide feedback on the quality of a particular visit or service, or the timeliness with which the service was performed. Based on the messages, adjustments may be made (such as through updated training of the model 170). By enabling providers to contribute feedback, the system can adapt and optimize its processes based on frontline insights, which may enable ongoing enhancement of service delivery. For instance, received data may indicate that the set times for certain home care visits with a recipient consistently coincide with the recipient's previously scheduled medical appointments, causing repeated rescheduling. Based on this determination, the coordination server 116 may automatically adjust the scheduling process (such as by adding additional information to the first data for the recipient) to avoid such conflicts. As another example, received data may indicate that schedules 164 determined by the coordination server 116 often result in long travel times for providers. In such instances, the scheduling process may be updated (such as by training the model 170 to incorporate overall travel times for providers) to address the issue.

In certain implementations, at least a portion of the data received by the system may be received from medical devices and equipment. For example, during a home care visit for diabetes care management, data may be received from a connected glucose meter that records blood sugar levels before and after insulin administration. This information can then be transmitted to the system to verify that the care procedure was performed correctly and at the appropriate times, ensuring the patient's treatment regimen adheres to prescribed medical guidelines. In certain implementations, such data may be used to train the model 170, such as to better select providers, better estimate a duration of a scheduled visit, and the like.

In certain implementations, the coordination server 116 may be configured with special processes for situations when services need to be provided immediately (such as emergencies). In such instances, the system can prioritize emergency service requests and expedite service authorization, provider selection, and scheduling processes to ensure that urgent care needs are met promptly. For example, if a recipient experiences a sudden cardiac event, the system 100 may immediately flag this as a high-priority emergency and bypass standard processing times to quickly authorize and schedule immediate cardiological assessment and intervention by the nearest available specialist with the necessary qualifications.

In certain implementations, the system 100 may provide or otherwise distribute informational and/or training materials and resources to providers, recipients, or a combination thereof. For example, such materials may be transmitted to member devices 146 and/or computing devices associated with providers.

In certain implementations, the system 100 may be configured to collect data regarding performance metrics on an aggregated or individual basis regarding providers and/or recipients of services. The system 100 may then be configured to display a graphical user interface showing graphs or other indications of the performance metrics. For example, the graphical user interface could display a dashboard to healthcare administrators that shows average response times, patient satisfaction ratings by provider, and frequencies of service complications across different regions or specialties.

As discussed above, the model 170 may be implemented as one or more machine learning models, including supervised learning models, unsupervised learning models, other types of machine learning models, and/or other types of predictive models. For example, the model 170 may be implemented as one or more of a neural network, a transformer model, a decision tree model, a support vector machine, a Bayesian network, a classifier model, a regression model, and the like. The model 170 may be trained based on training data to determine the prioritized list 172, the schedule 174, or both. For example, the model 170 may include separate models configured to determine the prioritized list 172 and the schedule 174. The training data sets may specify one or more expected outputs. For example, one or more training datasets may be used that contain example service information, provider data, and recipient data, along with corresponding expected prioritized lists for the example data. As another example, one or more training datasets may be used that contain example provider data and recipient data, along with corresponding expected schedules for the example data. Parameters of the model 170 may be updated based on whether the model 170 generates correct outputs when compared to the expected outputs. In particular, the model 170 may receive one or more pieces of input data from the training data sets that are associated with a plurality of expected outputs. The model 170 may generate predicted outputs based on a current configuration of the model 170. The predicted outputs may be compared to the expected outputs and one or more parameter updates may be computed based on differences between the predicted outputs and the expected outputs. In particular, the parameters may include weights (e.g., priorities) for different features and combinations of features. The parameter updates the model 170 may include updating one or more of the features analyzed and/or the weights assigned to different features or combinations of features (e.g., relative to the current configuration of the model 170).

Figure 2:
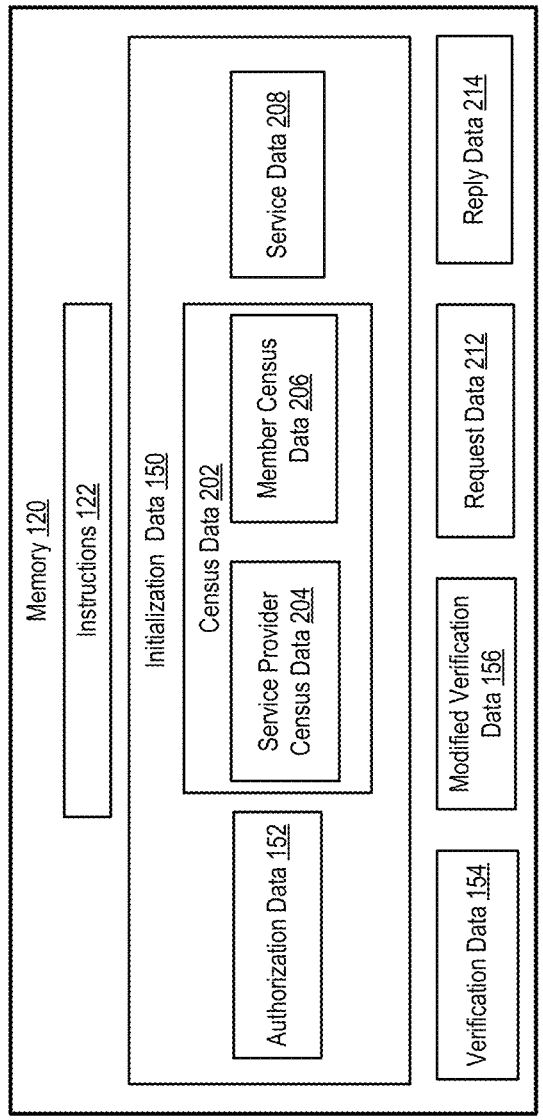
FIG. 2 is a block diagram depicting data types stored in a memory of a coordination server and that support data coordination according to one or more aspects.

FIG. 2 is a block diagram depicting data types stored in a memory of a coordination server and that support data coordination according to one or more aspects. In particular, FIG. 2 depicts data types stored in the memory of the coordination server after the coordination server executes a typical cycle of operation as described with reference to FIG. 1. As shown in FIG. 2, memory 120 stores, in addition to instructions 122, initialization data 150 received from a client server, such as client server 124, and verification data 154, received from a service server, such as service server 102. Additionally, memory 120 stores modified verification data 156 and request data 212, corresponding to a request, such as request 158, received from the service server. Further, memory 120 stores reply data 214, corresponding to reply 160, received at the coordination server from the client server, via an exchange server, such as exchange server 136.

Initialization data 150 may include authorization data 162, census data 202, and service data 208. Census data 202 may include service provider census data 204 and member census data 206. Service provider census data 204 may include or correspond to one or more unique identifiers associated with one or more service providers authorized, by a client controlling the client server, to provide services on behalf of the client for one or more of the client's members. For example, in the context of medical services, service provider census data 204 may include or correspond to identifiers associated with one or more medical service providers authorized, by an insurance company, to provide medical services. Member census data 206 may include or correspond to one or more unique identifiers associated with one or more members, such as enrolled members of an insurance company. For instance, in the context of medical services, member census data 206 may include or correspond to customers of a health insurance company (e.g., insured patients).

As depicted in FIG. 2, the coordination server may serve as a data nexus for a data processing system, such as for data processing system 100, thereby facilitating data coordination among a plurality of devices associated with data processing system 100. To illustrate, the coordination server, such as coordination server 116, may store, in its memory, such as memory 120, each item of a plurality of data items associated with effectuating one or more transactions. For example, in an insurance context, memory 120 of the coordination server may store data to effectuate one or more insurance service transactions, such as the processing of one or more insurance claims. To elaborate and in this context, authorization data 152 may include or correspond to authorization to perform a service. For instance, in the context of property insurance, the authorization may include or correspond to an authorization from an adjuster to authorize one or more remediations to a property covered by a property insurance policy. Service provider census data 204 may include or correspond to identifiers uniquely identifying one or more contractors authorized, by an insurance company, to perform the one or more repairs corresponding to authorization data 152. Member census data 206 may include or correspond to one or more unique identifiers associated with homeowners insured by an insurance company that controls or manages the client server, such as client server 124. Service data 208 may include data about the authorized services, such as a quantity of authorized services, a total amount of money authorized for performance of the authorized services, or combinations thereof.

Verification data 154 may include or correspond to geolocation data indicating that a service provider, authorized to perform the one or more authorized services is or was at a property of the enrolled member homeowner. Additionally, verification data 154 may include biometric data (e.g., a fingerprint, an iris scan, etc.) indicating an identity of the contractor who performed the authorized service at the insured property. Modified verification data 156 may indicate that the authorized service was or was not completed. For instance, modified verification data 156 may indicate that a repair service was completed. Request data 212 may include or correspond to a request for payment by the contractor that performed the remediation service at the homeowner's property. Reply data 214 may include or correspond to payment data so that the contractor that performed the remediation service may draw money from an insurance company's account. Alternatively, reply data 214 may include or correspond to a denial of payment.

Each of service provider identifier 510, 522 may include a plurality of data fields, storing data associated with each service provider corresponding to service provider identifier 512, 522. For instance, service provide identifier 510 includes eligible service identifier 512 uniquely identifying an authorized service to be provided by the service provider associated with service provider identifier 510. Similarly, service provider identifier 522 includes eligible service identifier 524 uniquely identifying an authorized service to be provided by the service provider associated with service provider identifier 522. These services may be distinct. For instance, eligible service identifier 512 may correspond to a first service associated with an authorization 508, while eligible service identifier 524 may correspond to a second service, distinct from the first service associated with authorization 508.

Eligible service identifier 512 may include or be associated with eligible service quantity 514, verification data 516, request identifier 518, and reply identifier 520. For example, eligible service quantity 514 may denote a quantity of the eligible service associated with eligible service identifier 510 authorized to be provided. To illustrate, in a health care context, eligible service quantity 514 may indicate a quantity of physical therapy session associated with an authorized physical therapy service. Verification data 516 may include data indicating whether the service associated with eligible service identifier 512 was actually performed. Request identifier 518 may include data associated with a request for payment for performed services associated with eligible service identifier 512. Reply identifier 520 may include data associated with payment information to effectuate payment for the performed services associated with eligible service identifier 512.

As explained above, eligible service identifier 524 may be associated with a second service that is distinct from the first service associated with eligible service identifier 512. Accordingly, data associated with the second service may be different from data associated with the first service. For example, while the first service associated with eligible service identifier 512 may include quantities of service, such as a quantity of physical therapy sessions, a second service associated with eligible service identifier 524 may be a singular service that cannot be divided in quantities of service. Hence, while eligible service identifier 512 may be associated with eligible service quantity field 514, eligible service identifier 524 may lack such a field.

In an insurance context, client identifier 504 may be associated with a particular insurance company that operates a client server, such as client server 102. Accordingly, a second data record (not depicted) may be associated with a second client identifier (not depicted) that is associated with a second insurance company that operates a second client server.

Member identifier 506 may uniquely identify an insured member of the client to which client identifier 504 corresponds. For instance, member identifier 506 may be a unique value assigned to distinguish a first member and data associated with the first member from a second member and data associated with the second member. Authorization 508 may be an authorization, received from a clinician device associated with a clinician, to authorize performance of a first service performed by a first service provider associated with service provider identifier 510 and a second service performed by a second service provider associated with service provider identifier 522. For instance, the first service may include or correspond to physical therapy services performed at a home of the member, while a second service may include or correspond to a one-time doctor's visit performed at the home of the member. Eligible service identifier 512 may uniquely identify the physical therapy services, while eligible service identifier 522 may uniquely identify the doctor's visit, distinguishing the doctor's visit from the physical therapy services. Eligible service quantity 514 may indicate a quantity of physical therapy services authorized to be performed. Verification data 516, 526 may include, respectively, geolocation data associated with a device of the first service provider and the second service provider, biometric data (such as voice record) of the first service provider and the second service provider, dates and time at which the first service and the second service were performed, or combinations thereof.

Request identifier 518 may be associated with a request, by the first service provider, for payment of at least one session of physical therapy services, while request identifier 528 may be associated with a request, by the second service provider, for payment for a completed doctor's visit. Reply identifier 520 may be associated with a reply, generated by a client server (e.g., client server 124) in response to the request associated with request identifier 518. For instance, assuming that ten physical therapy sessions were authorized, and the request associated with request identifier 518 corresponds to a request for payment for all ten physical therapy sessions but verification data 516 indicates that only one out of the ten physical therapy sessions were completed, the reply associated with reply identifier 520 may correspond to a denial of payment. Conversely, the reply associated with reply identifier 520 may correspond to payment for one of the ten physical therapy sessions, but not payment for the uncompleted or unperformed physical therapy sessions.

Figure 3:
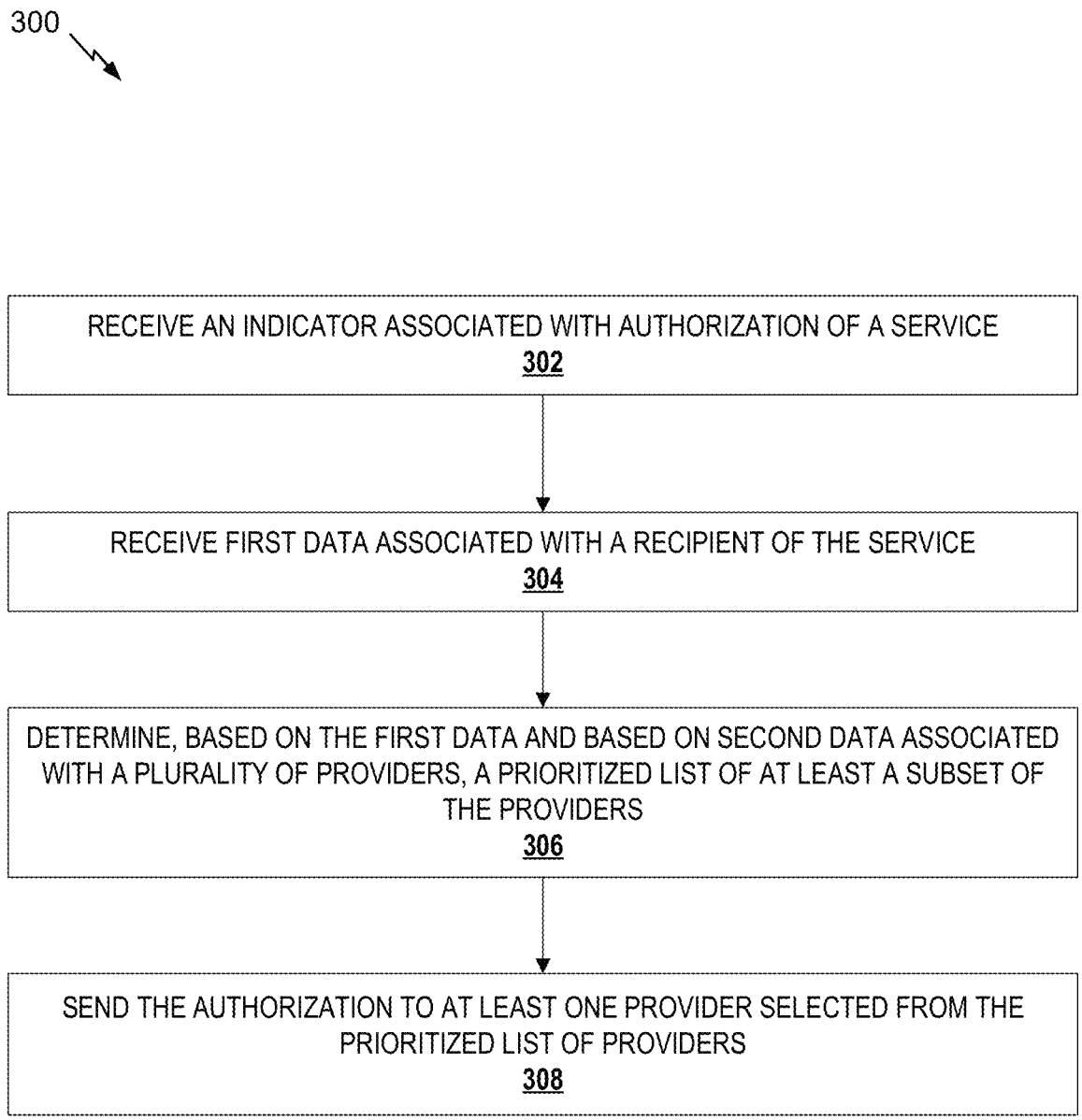
FIG. 3 is a flow diagram of an example method that supports data coordination according to one or more aspects.

FIG. 3 is a flow diagram of an example method 300 that supports data coordination according to one or more aspects. Operations of method 300 may be performed by a coordination server, such as coordination server 116 described above with reference to FIGS. 1-2. For example, example operations of method 300 may enable coordination server 116 to support provider selection and recommendation for authorized services.

At block 302, the method 300 includes receiving an indicator 151 associated with the authorization of a service. This indicator may be received from a client server associated with a payer, such as an insurance company. The indicator 151 may include details such as the type of service authorized, the duration and frequency of the service, and other pertinent parameters associated with the service authorization.

At block 304, the method 300 includes receiving first data associated with the recipient of the service. This data may be received from the client server and may include member census data indicating that the recipient is an enrolled member of an insurance company. In certain implementations, the first data may include location information for the recipient, information regarding the frequency of the service required, scheduling preferences, and specific task requirements for the service, such as the type of care needed (e.g., physical therapy, personal care) and the required frequency and duration of services.

At block 306, the method 300 includes determining a prioritized list of at least a subset of providers based on the first data and second data associated with a plurality of providers. The second data may be received from an exchange server maintaining updated information on various providers. The second data may include provider census data indicating which services the providers are authorized to perform by insurance companies, geographic location information, skills and capabilities, availability and capacity information, and travel capabilities. In certain implementations, the providers may be filtered based on geographic proximity to the recipient, service compatibility, availability of provider capacity, and other factors. In certain implementations, one or more machine learning models 170 may analyze both the first data and/or the second data to generate corresponding scores for each provider. The scores, based on predefined criteria including geographic proximity, service compatibility, provider availability, and historical performance data, may then be used to determine the prioritized list of providers.

At block 308, the method 300 includes sending the authorization to at least one provider selected from the prioritized list. The authorization process may also involve assigning a specific time window within which the selected provider can accept or reject the authorization. If the provider does not respond within the designated time window, the method may include reassigning the authorization to another provider from the prioritized list, ensuring that the authorized service is allocated promptly.

In certain implementations, the method includes establishing a secure communication channel between the recipient and the selected provider to facilitate coordination of care, ensuring that sensitive information is exchanged safely in compliance with privacy regulations.

Figure 4:
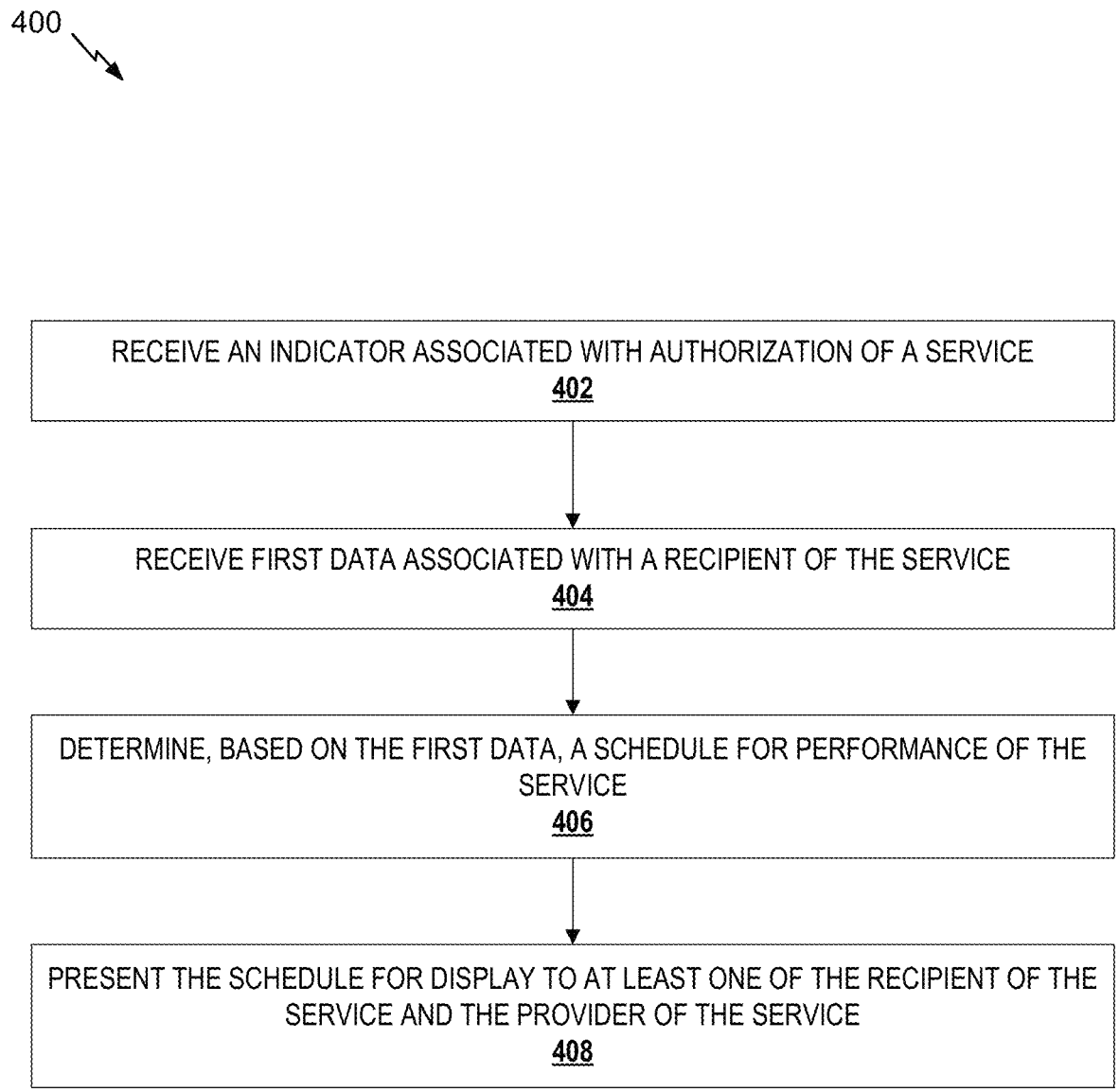
FIG. 4 is a flow diagram of an example method that supports data coordination according to one or more aspects.

FIG. 4 is a flow diagram of an example method 400 that supports data coordination according to one or more aspects. Operations of method 400 may be performed by a coordination server, such as coordination server 116 described above with reference to FIGS. 1-2. For example, example operations of method 400 may enable coordination server 116 to support provider automated scheduling for the performance of authorized services.

At block 402, the method 400 includes receiving an indicator 151 associated with the authorization of a service. At block 404, the method 400 includes receiving first data associated with the recipient of the service. Blocks 402 and 404 may be performed similar to blocks 302 and 304 of the method 300, discussed above.

At block 406, the method 400 includes determining, based on the first data and optionally second data, a schedule for the performance of the service. The schedule identifies at least one provider for the service and one or more times for which the service is to be performed. The second data may include various details about the provider, such as availability, capacity, provider census data indicating services authorized by an insurance company, geographic location, skills and capabilities, and travel capabilities. The schedule may also identify assigned tasks for the provider, ensuring clarity about the expectations and responsibilities during each service visit.

At block 408, the method comprises presenting the schedule for display to at least one of the recipient of the service and the provider of the service. The initial draft of the schedule may be displayed to the recipient and/or provider of the service feedback, which may be received as response messages from corresponding device. For example, the method 400 may also include receiving responses from at least one of the recipient and the at least one provider, allowing for adjustments to the schedule based on the input received. Adjustments may include resolving scheduling conflicts which may be caused by overlapping tasks, unavailability of the provider, or other factors. Changes in conditions for the service, the provider, or the recipient may also prompt adjustments to the schedule to comply with the updated requirements.

In certain implementations, the method 400 may further include determining, based on the first data and the second data, a prioritized list of at least a subset of the providers, which may then be used to select the at least one provider in accordance with the prioritized list. For example, the prioritized list may be determined before determining the schedule.

Certain features that are described in this specification in the context of separate implementations also can be implemented in combination in a single implementation. Conversely, various features that are described in the context of a single implementation also can be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

What is claimed is:

1. A method comprising:
   receiving an indicator associated with authorization of a service, wherein the indicator indicates a type of service, a duration of service, and a frequency of service authorized by a payer for the service;
   receiving first data associated with a user enrolled with the payer to be a recipient of the service;
   determining, with a machine learning model, corresponding scores for a plurality of providers authorized by the payer to provide the service based on the indicator, the first data, second data associated with at the plurality of providers, and historical data for the plurality of providers indicating provider performance, client satisfaction, matching success, or a combination thereof;
   determining a prioritized list of at least a subset of the providers in accordance with the corresponding scores for the plurality of providers; and
   sending an authorization to at least one provider selected from the prioritized list to provide the service to the user.

2. The method of claim 1, wherein the first data comprises member census data for the recipient of the service and indicates that the recipient of the service is an enrolled member of an insurance company.

3. The method of claim 1, wherein the first data further comprises location information for the recipient.

4. The method of claim 1, wherein the second data comprises provider census data for the plurality of providers and indicates corresponding services for which the providers are authorized by an insurance company.

5. The method of claim 1, wherein the second data comprises provider location information, provider capability information, provider availability information, provider capacity information, provider travel capabilities, or a combination thereof.

6. The method of claim 1, wherein determining the prioritized list comprises filtering the plurality of providers based on geographic proximity to the recipient, service compatibility for the service, capacity availability, or a combination thereof.

7. The method of claim 1, wherein the corresponding scores are further determined based on predefined criteria comprising at least one of geographical proximity, service compatibility, provider availability, or a combination thereof.

8. The method of claim 1, further comprising determining, based on the first data and the second data, a schedule for performance of the service, wherein the schedule identifies the at least one provider for the service and one or more times for which the service is to be performed.

9. The method of claim 1, further comprising providing a secure communication channel between the recipient and the at least one provider.

10. The method of claim 1, wherein sending the authorization comprises assigning a time window for the at least one provider to accept or reject the authorization.

11. The method of claim 10, further comprising sending, after the time window expires, the authorization to another provider selected from the prioritized list of providers.

12. The method of claim 1, wherein:
   the indicator associated with authorization of the service is received from a client server;
   the first data is received from the client server;
   the second data is received from an exchange server;
   the authorization of the service is sent to a service server; or
   a combination thereof.

13. A method comprising:
   receiving an indicator associated with authorization of a service, wherein the indicator indicates a type of service, a duration of service, and a frequency of service authorized by a payer for the service;
   receiving first data associated with a user enrolled with the payer to be a recipient of the service;
   determining, with a machine learning model, corresponding scores for a plurality of providers authorized by the payer to provide the service based on the indicator, the first data, second data associated with the plurality of providers, and historical data for the plurality of providers indicating provider performance, client satisfaction, matching success, or a combination thereof;
   determining, based on the corresponding scores, a schedule for performance of the service, wherein the schedule identifies at least one provider selected from the plurality of providers based on the corresponding scores and one or more times for which the service is to be performed; and
   presenting the schedule for display to at least one of the recipient of the service and the provider of the service.

14. The method of claim 13, further comprising:
   determining a prioritized list of at least a subset of the providers in accordance with the corresponding scores for the plurality of providers; and
   selecting the at least one provider in accordance with the prioritized list.

15. The method of claim 13, wherein the schedule further identifies assigned tasks for the at least one provider.

16. The method of claim 13, further comprising:
   receiving, from at least one of the recipient and the at least one provider, a response from at least one of the recipient and the at least one provider;
   determining an adjusted schedule based on the response and the schedule; and
   presenting the adjusted schedule for display to at least one of the recipient of the service and the provider of the service.

17. The method of claim 16, wherein the response indicates a scheduling conflict and adjusting the schedule comprises resolving the scheduling conflict.

18. The method of claim 17, wherein the scheduling conflict is caused by overlapping tasks for the at least one provider, unavailability of the at least one provider, or a combination thereof.

19. The method of claim 16, wherein the response indicates a changed condition for the service, the provider, the recipient, or a combination thereof, and wherein the adjusted schedule complies with the changed condition.

20. The method of claim 19, wherein the changed condition comprises a changed requirement for the service, a changed availability of the at least one provider, a changed availability of the recipient, or a combination thereof.

21. A system comprising:
a processing system that includes one or more processors and one or more memories coupled with the one or more processors, the processing system configured to:
receive an indicator associated with authorization of a service, wherein the indicator indicates a type of service, a duration of service, and a frequency of service authorized by a payer for the service;
receive first data associated with a user enrolled with the payer to be a recipient of the service;
determine, with a machine learning model, corresponding scores for a plurality of providers authorized by the payer to provide the service based on the indicator, the first data, second data associated with at the plurality of providers, and historical data for the plurality of providers indicating provider performance, client satisfaction, matching success, or a combination thereof;
determine a prioritized list of at least a subset of the providers in accordance with the corresponding scores for the plurality of providers; and
send an authorization to at least one provider selected from the prioritized list to provide the service to the user.

22. A system comprising:
a processing system that includes one or more processors and one or more memories coupled with the one or more processors, the processing system configured to:
receive an indicator associated with authorization of a service, wherein the indicator indicates a type of service, a duration of service, and a frequency of service authorized by a payer for the service;
receive first data associated with a user enrolled with the payer to be a recipient of the service;
determine, with a machine learning model, corresponding scores for a plurality of providers authorized by the payer to provide the service based on the indicator, the first data, second data associated with the plurality of providers, and historical data for the plurality of providers indicating provider performance, client satisfaction, matching success, or a combination thereof;
determine, based on the corresponding scores, a schedule for performance of the service, wherein the schedule identifies at least one provider selected from the plurality of providers based on the corresponding scores and one or more times for which the service is to be performed; and
present the schedule for display to at least one of the recipient of the service and the provider to provide the service to the user.

* * * * *